(12) United States Patent
Berry

(10) Patent No.: US 12,201,988 B2
(45) Date of Patent: Jan. 21, 2025

(54) IMPACT MATERIAL PROCESSING DEVICE

(71) Applicant: SEED TERMINATOR HOLDINGS PTY LTD, South Australia (AU)

(72) Inventor: Nicholas Kane Berry, South Australia (AU)

(73) Assignee: SEED TERMINATOR HOLDINGS PTY LTD, South Australia (AU)

(*) Notice: Subject to any disclaimer, the term of this patent is extended or adjusted under 35 U.S.C. 154(b) by 267 days.

(21) Appl. No.: 17/797,491

(22) PCT Filed: Feb. 5, 2021

(86) PCT No.: PCT/AU2021/050097
§ 371 (c)(1),
(2) Date: Aug. 4, 2022

(87) PCT Pub. No.: WO2021/155444
PCT Pub. Date: Aug. 12, 2021

(65) Prior Publication Data
US 2023/0053959 A1 Feb. 23, 2023

(30) Foreign Application Priority Data
Feb. 5, 2020 (AU) .................. 2020900316

(51) Int. Cl.
*B02C 13/30* (2006.01)
*B02C 13/18* (2006.01)
*B02C 13/284* (2006.01)

(52) U.S. Cl.
CPC ........ *B02C 13/284* (2013.01); *B02C 13/1835* (2013.01); *B02C 13/30* (2013.01)

(58) Field of Classification Search
CPC . B02C 13/284; B02C 13/1835; B02C 13/185; B02C 13/30; B02C 13/2804
(Continued)

(56) References Cited

U.S. PATENT DOCUMENTS

| 944,241 A | * | 12/1909 | Jordan | ................. B02C 13/284 241/168 |
| 2,557,865 A | | 6/1951 | Emmanouilidis | |

(Continued)

FOREIGN PATENT DOCUMENTS

| AU | 1996071759 | 11/1996 |
| AU | 2001/038781 | 4/2001 |

(Continued)

OTHER PUBLICATIONS

International Search Report and the Written Opinion for PCT/AU2021/050097, dated Apr. 6, 2021.
(Continued)

*Primary Examiner* — Faye Francis
(74) *Attorney, Agent, or Firm* — ANDRUS INTELLECTUAL PROPERTY LAW, LLP

(57) ABSTRACT

An impact processing device has a central impact mechanism that rotates about a rotation axis and a processing stage that includes the impact mechanism and a structure extending circumferentially about the impact mechanism. The structure has a processing sector, and a screening sector. The processing sector extends for a first circumferential portion of the structure and has an impervious textured surface. The screening sector has a plurality of holes and extends for a second circumferential portion of the structure. The impact mechanism is operable to impact material against the processing sector and generate a flow of the impacted material to screening sector through which at least a portion of the impacted material can pass.

17 Claims, 11 Drawing Sheets

(58) Field of Classification Search
USPC .................................................... 241/73, 74
See application file for complete search history.

(56) References Cited

U.S. PATENT DOCUMENTS

| | | | |
|---|---|---|---|
| 3,448,933 A | 6/1969 | Roy et al. | |
| 4,813,619 A | 3/1989 | Tjumanok et al. | |
| 5,059,154 A | 10/1991 | Reyenga | |
| 9,723,790 B2 * | 8/2017 | Berry | A01D 41/1243 |
| 10,485,178 B2 * | 11/2019 | Mayerle | A01D 69/00 |
| 11,547,054 B2 * | 1/2023 | Mayerle | A01F 12/40 |
| 2015/0373913 A1 * | 12/2015 | Berry | A01F 12/00 460/149 |
| 2018/0070534 A1 * | 3/2018 | Mayerle | A01F 12/40 |
| 2019/0200533 A1 | 7/2019 | Mayerle | |
| 2019/0283034 A1 | 9/2019 | Berry | |
| 2020/0236850 A1 * | 7/2020 | Mayerle | A01D 41/14 |

FOREIGN PATENT DOCUMENTS

| | | |
|---|---|---|
| AU | 2017228663 | 10/2017 |
| AU | 2019202177 | 10/2019 |
| DE | 10203502 | 10/2003 |
| FR | 2776468 | 10/1999 |
| WO | 2009/100500 | 8/2009 |
| WO | 2014127408 | 8/2014 |
| WO | 2018053600 | 3/2018 |
| WO | 2019046973 | 3/2019 |
| WO | 2019178651 | 9/2019 |
| WO | 2021077180 | 4/2021 |

OTHER PUBLICATIONS

Berry, Unpublished U.S. Appl. No. 17/767,782, filed Apr. 8, 2022 (see WO2021/077180).

* cited by examiner

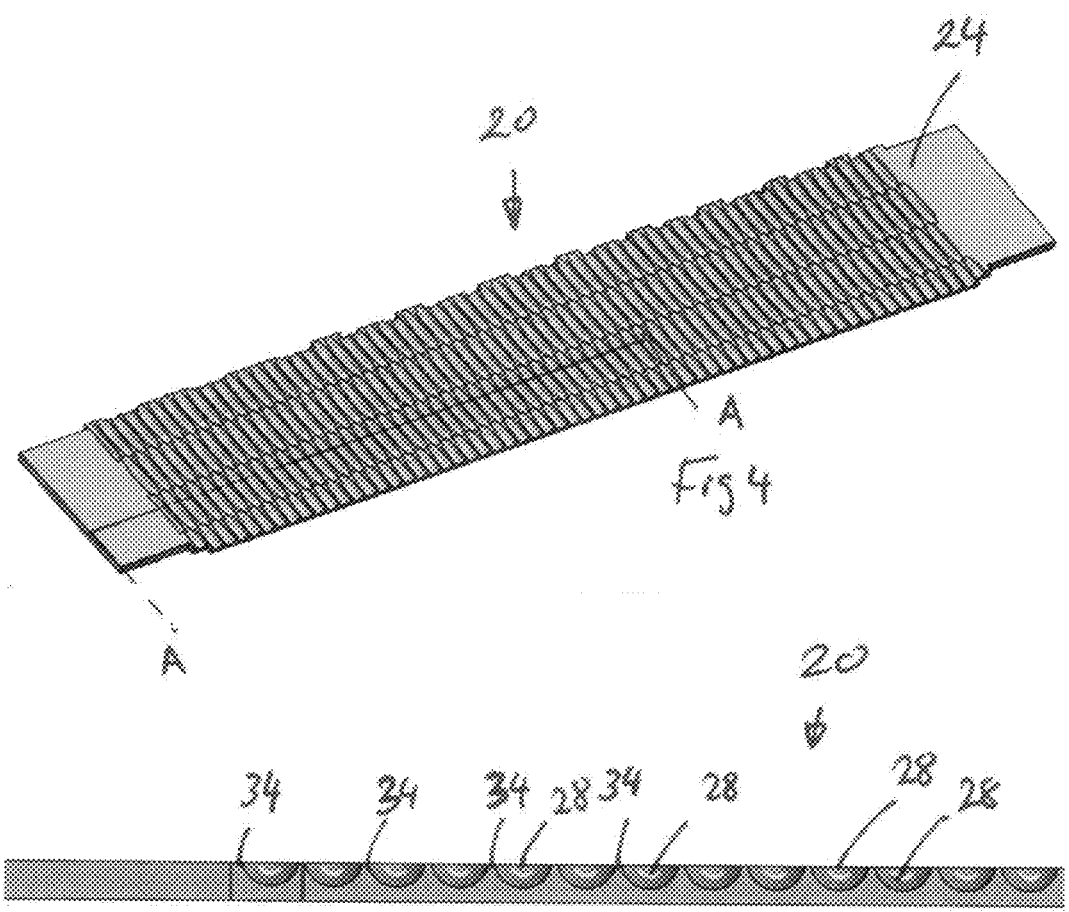
Fig 4
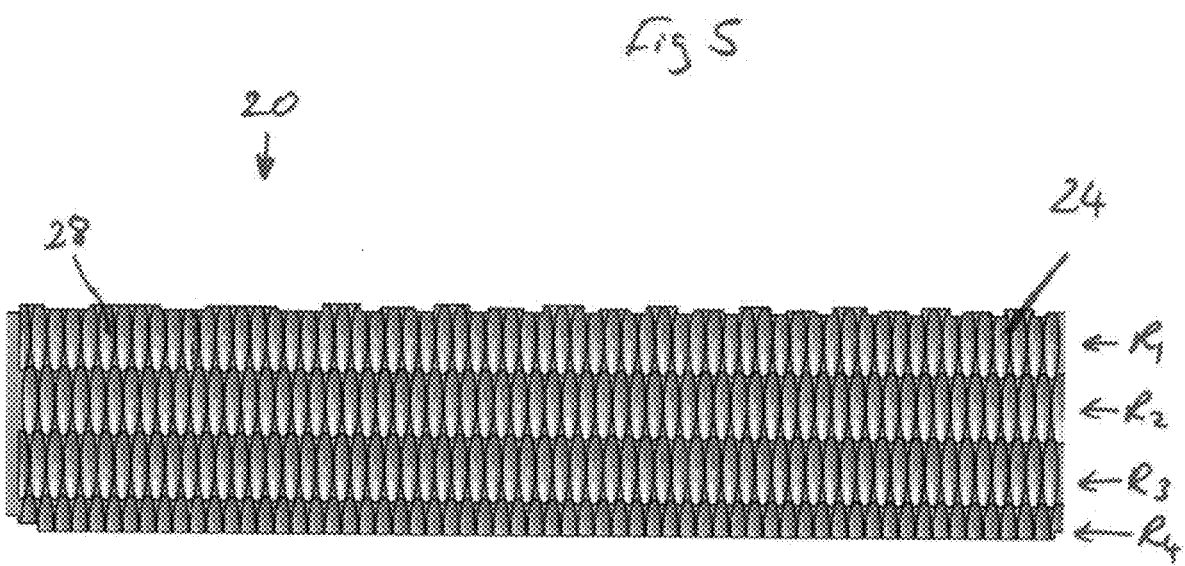
Fig 5
Fig 6

IMPACT MATERIAL PROCESSING DEVICE

CROSS-REFERENCE TO RELATED APPLICATIONS

This application is the U.S. national stage application of International Application PCT/AU2021/050097, filed Feb. 5, 2021, which international application was published on Aug. 12, 2021, as International Publication WO 2021/155444 in the English language. The International Application claims priority of Australian Patent Application No. 2020900316, filed Feb. 5, 2020. The international application and Australian application are both incorporated herein by reference, in entirety.

TECHNICAL FIELD

An impact material processing device is disclosed. The device may have application for processing harvested materials including but not limited weed seeds carried in chaff. The processing is for the purpose of devitalising the weed seeds. The device may be mounted on a combine harvester to process the chaff simultaneously with the harvesting of a crop.

BACKGROUND ART

Weeds and weed control are, and always have been, one of the biggest constraints and costs to grain production. Weeds are a perpetual problem that limit the food production capacity of agricultural areas around the globe. Weeds compete with the cultivated crops for water, sunlight and nutrients. In the past 50 years there has been a shift from tillage to herbicides as being the most important tool to control weeds. Herbicides in general provide much better control of weeds than tillage methods and do not have the major issues of soil erosion, moisture loss and breakdown of soil structure. The wide spread use and reliance of herbicides has resulted in weeds evolving resistance to herbicides. The herbicide resistance is now widespread and presents one of the biggest threats to global food security. Strategies to provide non-chemical weed control to complement herbicides are now paramount to reduce the selection pressure for herbicide resistance. One particular method of significant renewed interest is destroying weed seeds at harvest time to interrupt the weed cycle.

Many in crop weeds share a similar life cycle to harvested crops. Once a crop matures and is harvested, there is a broad range of weeds that have viable seeds remaining on the plant above the cutting height of the harvester. These weeds enter the harvester and their seeds either end up in a grain tank, out with straw residues, or out with chaff residues. There is a range of factors that determine where a weed seed will end up at harvest time including moisture content, maturity, and harvester setup. A major factor that determines where a seed ends up is the aerodynamic properties of the seeds or its terminal velocity. Often a weed seed is much lighter than the grain being harvested. Crop cleaning system used during harvesting employ a winnowing action to remove light chaff material from the heavier grain using airflow and mechanical sieving. The light weed seeds are caught in the wind and can exit the back of the harvester sieve. The residues and contained weed seeds are then spread on the ground to be a problem for next year. The residues also contain a proportion of grain being harvested that could not be separated by the harvester. This grain loss has the potential to become a volunteer weed after harvest. There is an opportunity to intercept and destroy weed seeds in the residues before allowing them to become a problem for next year's crop.

One method to destroy these weed seeds is to use a processing technology. Processing technology has been used for particle size reduction of a range of feedstock for over a century. Processing technology can be separated into crushing and impact technology.

The most common crushing size reduction technology is the roller mill. Roller mills have been investigated for the purpose of destroying weed seeds at harvest time. Roy and Bailey (1969) U.S. Pat. No. 3,448,933 describe a roller shear mill for destroying weed seeds out of clean grain screenings. Reyenga (1991) U.S. Pat. No. 5,059,154 describes using a separating device and roller mill to crush foreign matter such as weed seeds. A limitation of the roller mill is the ability to handle the bulk of residue material that contains the weed seeds and thus rely on a separation means to reduce the residue material.

Impact mills use high impact speeds generated by rotating elements to pulverise material. Impact mills have also been of interest for the destruction of weed seeds at harvest.

A widely used type of impact mill is a hammer mill, which uses a rotor with impact elements to pulverise material and a screen to classify the output size distribution. Hammer mills are highly versatile and are able to accept a wide range feed materials. Plant material such as crop residues is fibrous and difficult to process. The use of hammer mills to devitalise weed seeds in crop residues has been well documented. The use of hammer mills on board a harvester to devitalise weed seeds has been subject of multiple patents (e.g. Wallis (1995) AU1996071759 Bernard (1998) FR2776468B1)).

An advantage of hammer mills is that in addition to impact, they induce crushing, shear and attrition forces that make them particularly useful for size reduction of fibrous materials. Another advantage of hammer mills is that they often have flexible impact elements that are replaceable and can handle some foreign objects without damage.

A further advantage of the hammer mill is that the screen size controls particle fineness and can then control the proportion of weed devitalisation. Control of output size distribution is particularly valuable in the processing of crop residues where material type and moisture conditions change significantly. Change in material conditions result in still similar output size distribution and weed seed devitalisation remains less dependent on material conditions than would be without the use of screens.

A disadvantage of current hammer mills is that the screen which controls particle size distribution determines throughput capacity. In general, to devitalise weed seeds a small screen size is required and hence throughput capacity is limited. A hammer mill with concentric screens of varying sizes has been described by Emmanouilidis (1951) U.S. Pat. No. 2,557,865. The Emmanouilidis mill has a central impact zone and additional screens are used to separate output material into different size fractions. The inner primary zone in the Emmanouilidis mill still dictates capacity and overall size reduction.

A different type of impact mill is a cage mill. A cage mill applies predominantly impact forces and level of size reduction is set through rotational speed and the number of concentric rows of bars. There is no classification of particle size with a cage mill. The impact forces in a cage mill make them suitable for friable or brittle materials and are not widely used for processing fibrous materials. However, one example is described in AU 2001/038781 (Zani) which is proposed for destruction of weed seeds. The Zani cage mill has concentric rows of impact elements supported by a ring.

The mill is driven at high impact speed to destroy weed seeds. The arrangement can be neatly integrated into the harvester. The arrangement however has limited capacity and cannot process the entire chaff residue fraction exiting the harvesters sieve. Therefore, the Zani system relied on sieving to concentrate the collect weed seeds for processing.

An increased capacity cage mill is described in WO 2009/100500 (Harrington) to handle the whole chaff material fraction to destroy weed seeds. The Harrington used a large counter rotating cage mill that has fan blades similar to Tjumanok et al 1989 (U.S. Pat. No. 4,813,619) to increase airflow and capacity. This cage mill is large, heavy, requires a complex counter rotating drive and requires considerable power to operate. The system has its own power package and is towed behind the grain harvester. The size, weight and drive, limits options to integrate the cage mill into the harvester. The mill incorporates cylindrical bars that limit impact speeds because of glancing blows. The impact speed therefore has a large distribution. To get sufficient impact energy into weed seeds requires counter rotation of the cage structures.

The current state of the art for seed destroying mill technology is described in WO2014/127408 (Berry Saunders). Berry Saunders uses a rotor stator cage mill that is much simpler to integrate into a grain harvester than the counter rotation systems. The Berry Saunders mill provides an advance on the Zani cage mill by improving the throughput capacity and seed kill performance of the mill system. It achieves this by using a central distribution element (also described in Isaak (2003) DE 10203502) and angular static bars that are slanted against the rotation of the rotor. A purportedly novel aspect of Berry Saunders mill is the spacing between the angled impact bars determines if a seed will pass through to the next row of impact bars or stay within the current row of impact bars. The size of the seed does not determine if it passes through the row of impact bars or remains.

The relatively simple workings of cage mills which apply predominantly impact and do not use size classification has enabled computer modelling techniques to be used to predict mill performance. The Berry Saunders mill has been optimised using computer modelling techniques to apply the ideal requirements to devitalise weed seeds using impact alone. However, there has been little concern for the airflow component of the power consumption. The rotor bars are narrow with sharp edges resulting in high drag coefficient and turbulence generation. The stator bars are orientated to result in torque converter or water brake dynamometer like turbulence generation and wasted heat generation.

One disadvantage of this approach is that the stator impact bars take up a lot of space radially. This in turns means that adjacent rows of rotating impact bars are spaced a long way apart. For a weed seed devitalisation mill, or a particle destruction mill for that matter impact speed is crucial. When impact bars are spaced widely apart the impact speed difference between each subsequent row is significant.

The above references to the background art do not constitute an admission that the art forms a part of the common general knowledge of a person of ordinary skill in the art. The above references are also not intended to limit the application of the disclosed device and related processing method as disclosed herein.

SUMMARY OF THE DISCLOSURE

In a first aspect there is disclosed an impact processing device comprising:
a central impact mechanism arranged to rotate about a rotation axis;
the first processing stage comprising the impact mechanism and a first structure extending circumferentially about the impact mechanism, the first structure having a first processing sector, and a first screening sector, wherein the processing sector extends for a first circumferential portion of the first structure and comprises an impervious textured surface and the first screening sector comprise a plurality of holes and extends for a second circumferential portion of the first structure, the impact mechanism operable to impact material against the first processing sector and generate a flow of the impacted material to first screening sector through which at least a portion of the impacted material can pass.

In one embodiment the first surface comprises a plurality of valleys.

In one embodiment at least some of the valleys have two orthogonal axes of unequal length.

In one embodiment a shorter of the orthogonal axes extend in a circumferential direction with respect to the rotation axis.

In one embodiment a longer of the orthogonal axes extend parallel to the rotation axis.

In one embodiment the valleys have edges that lie on respective edge radii of the same length from the rotation axis.

In one embodiment the impervious surface comprises plurality of lands between the valleys wherein every point on the lands lie on respective land radii of the same length from the rotation axis.

In one embodiment the edge radii are of the same length as the land radii.

In one embodiment first structure is configured so that if laid flat the lands would lie on the same plane.

In one embodiment the plurality of holes or gaps comprises holes or gaps of different open area.

In one embodiment the holes or gaps are arranged in sets of two or more wherein the open area of holes in a same set are the same and the open area of holes or gaps in different sets are different.

In one embodiment the open area of holes in different sets progressively changes in direction of rotation of the central impact mechanism about the rotation axis.

In one embodiment the open area of holes in different sets progressively decreases in direction of rotation of the central impact mechanism about the rotation axis.

In one embodiment the device comprises a second structure extending about and radially outward of the first structure, the second structure having a second processing sector, and a second screening sector, wherein the second processing sector extends for a first circumferential portion of the second structure and comprises a second impervious surface and the second screening sector comprise a plurality of holes and extends for a second circumferential portion of the second structure.

In one embodiment the first and second processing sectors are circumferentially offset from each other.

In one embodiment the first and second processing sectors are circumferentially offset from each other so that every radius from the rotation axis passes through at least one of the first and second processing surfaces.

In one embodiment first circumferential portion of the first structure and the first circumferential portion the second together extend for 360° or more.

In one embodiment the second surface comprises a plurality of second valleys.

In one embodiment at least some of the second valleys have two mutually orthogonal axes of unequal length.

In one embodiment a shorter of the orthogonal axes of the second valleys extend in a circumferential direction with respect to the rotation axis.

In one embodiment a longer of the orthogonal axes of the second valleys extend parallel to the rotation axis.

In one embodiment the second valleys have edges that lie on respective edge radii of the same length from the rotation axis.

In one embodiment the second impervious surface comprises a plurality of second lands between the second valleys wherein every point on the second lands lie on respective land radii of the same length from the rotation axis.

In one embodiment the edge radii of the second valleys are of the same length as the second land radii.

In one embodiment second structure is configured so that if laid flat the second lands would lie on the same plane.

In one embodiment the plurality of second holes comprises holes of different open area.

In one embodiment the second holes are arranged in sets of two or more wherein the open area of holes in a same set of second holes are the same and the open area of holes in different sets of the second holes are different.

In one embodiment the open area of second holes in different sets progressively changes in direction of rotation of the central impact mechanism about the rotation axis.

In one embodiment the open area of second holes in different sets progressively decreases in direction of rotation of the central impact mechanism about the rotation axis.

In one embodiment the first valleys and the second valleys have a different: (a) shape, or (b) size or (c) orientation, or (d) any combination of and two or more of (a), (b) and (c).

In one embodiment the device comprises a plurality of impact elements disposed between the first and second structures.

In one embodiment at least one of the impact elements comprises a first flat surface that lies parallel, or within 20 degrees, to a radial direction of the device.

In one embodiment a radially inner side of the at least one of the impact elements comprises a second flat face which forms an acute angle with the first flat face.

In one embodiment the at least one impact element comprises a curved surface extending between the first flat face and the second flat face.

In one embodiment the impact elements are arranged to rotate with the impact mechanism about the rotation axis.

In one embodiment wherein screening sectors are capable of rotating in a direction opposite to the impact mechanisms.

In one embodiment the first and second screening sectors are capable of rotating together is a fixed relationship about the rotation axis in a direction opposite to a direction of rotation of the impact mechanism.

In one embodiment wherein the impact mechanism comprises a plurality of impact flails coupled to and extending radially from a central hub, the central hub being arranged to rotate about the rotation axis; and wherein at least one of the impact flails is capable of pivoting about a pivot axis which lies parallel to the rotation axis.

In one embodiment wherein at least one of the flails has an axial face provided with a plurality of grooves which extend in a circumferential direction.

In another aspect there is disclosed a drive system for at least one impact material processing device when mounted on a combine having a straw chopper and a power take off, wherein the impact material processing device is arranged to receive a chaff stream produced by the combine and the straw chopper is arranged to receive a straw produced by the combine, the drive system comprising: a chopper pulley arrangement coupled to a driveshaft of the straw chopper, a device input pulley arranged to transfer drive to the at least one impact material processing device and a single common belt that engages the chopper pulley arrangement and the device pulley arrangement and wherein the single common belt is driven mechanically by and coupled to the combine power take off.

In one embodiment the drive system comprises one or more idler pulleys to increase an angle of wrap of the single common belt about one or both of the chopper pulley and the device pulley.

In one embodiment the single common belt engages and input pulley arrangement that receives power from the combine power take off and wherein the drive system further comprises a second belt that is coupled to the input pulley arrangement and the chopper pulley arrangement.

In one embodiment the chopper pulley arrangement comprises a large diameter chopper pulley and a small diameter chopper pulley wherein the large diameter chopper pulley and the small diameter chopper pulley are selectively disengage wherein a first of the chopper pulleys is rotationally fixed to a driveshaft of the chopper and the other of the chopper pulleys is disengaged from the driveshaft to rotate independently of the first of the chopper pulleys, and wherein the second belt engages the first of the chopper pulleys and the common belt engages the other of the chopper pulleys.

In one embodiment the second belt engages the large diameter chopper pulley and the common belt engages the small diameter chopper pulley.

In another aspect there is disclosed an impact material processing device comprising:
  a central impact mechanism arranged to rotate about a rotation axis;
    at least one stator having one or more openings through which material impacted by the impact mechanism can pass; at least one stator extending circumferentially about the impact mechanism,
    a housing extending about the stator, an upper plate and a base plate, the housing extending between the base plate and the upper plate and wherein the at least one stator is located with the housing and can be moved between a first position upper and lower edges of the at least one stator is on the base plate and an upper edge extends to at least an inside surface of the upper plate, and a bypass position where the at least one stator is moved to a position where the lower edge of the at least one stator is lifted from the base plate to form a gap through which material entering the device can flow radially beyond the at least one stator.

BRIEF DESCRIPTION OF THE DRAWINGS

Notwithstanding any other forms which may fall within the scope of the Device as set forth in the Summary, specific embodiments will now be described, by way of example only, with reference to becoming drawings in which:

FIG. 4 is a schematic representation of a first processing sector incorporated in the device shown in FIGS. 1-3 when laid flat;

FIG. 5 is a view of section AA of the first processing sector shown in FIG. 4;

FIG. 6 is a plan view of a portion of the first processing sector shown in FIG. 4;

DETAILED DESCRIPTION OF SPECIFIC EMBODIMENTS

Figure 1:
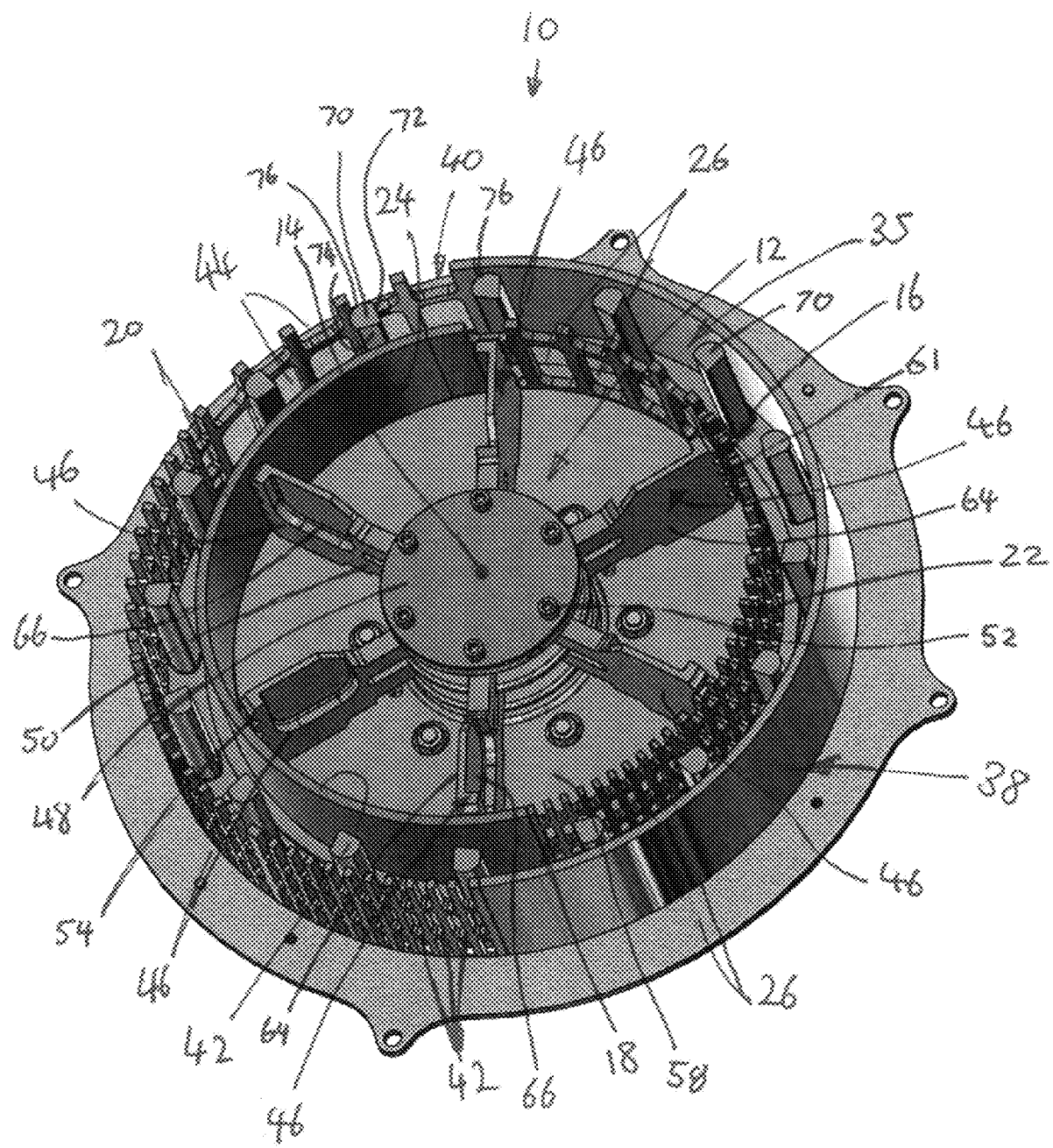
FIG. 1 is a schematic representation of a first embodiment of the disclosed system with an associated annular end plate removed.

With reference to the drawings an embodiment of the disclosed impact material processing device 10 (herein after "device 10") comprises a central impact mechanism 12 arranged to rotate about a rotation axis 14 and a first processing stage 16 that includes the impact mechanism 12 and a first structure 18 that extends circumferentially about the impact mechanism 12. The first structure 18 has a first processing sector 20, and a first screening sector 22. The processing sector 20 extends for a first circumferential portion θm of the first structure 18 and comprises an impervious surface 24. The surface 24 may be textured or smooth. The first screening sector is formed with a plurality of holes or gaps 26 and extends for a second circumferential portion θs of the first structure 18. The impact mechanism 12 is operable to impact material against the first processing sector 20 and generate a flow of the impacted material to the first screening sector 22 through which at least a portion of the impacted material can pass. In one example θm+θs=360°. In such an example θm may be in the order of 180°±30°.

While the impervious surface may be textured or smooth, for the sake of ease of description herein after unless otherwise indicated the surface 24 will be described as and taken to be a textured surface 24. The textured surface 24 can take many forms and in general terms is a surface having a plurality of surface reliefs such as surface valleys, pits or grooves and/or surface elevations such as ridges, ribs, bumps, protrusions and projections; or other irregularities. However, in this embodiment and as seen most clearly from FIGS. 4-7 the textured surface 24 comprises a plurality of the valleys 28 in an otherwise smooth surface. At least some of the valleys 28 have two orthogonal axes 30 and 32, which may be, and in this example are, of unequal length. A shorter of the orthogonal axes 30 extends in a circumferential direction with respect to the rotation axis 14. A longer of the orthogonal axes 32 extends parallel to the rotation axis 14. Yet in other embodiments the axis 32 can be oblique to the axis of rotation 14. When the axes 30 and 32 of unequal length the valleys 28 have a generally elliptical shape.

Between the valleys 28 the surface 24 is a plurality of lands 34 that are "flat" with respect to the axis of rotation 14 so that every point on the lands 34 lie on respective land radii of the same length. That is, if the processing sector 20 were laid out flat as shown in FIGS. 4-6 all the lands 34 are flat and lay on a common plane. The valleys 28 have edges 37 that lie on respective edge radii of the same length from the rotation axis. Thus, in this configuration the edges 37 all lie on the radii of the same length as those of the lands 34.

The valleys 28 are arranged in a generally uniform pattern of stacked circumferential rows R1, R2, R3, and R4. In rows R1-R3 the valleys 28 have respective axes 32 of the same length. However, in row R4 the valleys are of the shape of a hemi-ellipse and have a shorter axis 32. The number of rows of valleys in a processing sector 20 can vary and is dependent on the relative dimensions of the axes 32 and the overall height of the processing sector 30 in the direction of the axis 14. The ends of the valleys 28 in one row may, as they do in this embodiment, lie between the ends of adjacent valleys in an adjacent row.

In the embodiment shown in FIG. 1, but not all embodiments, some of the holes or gaps 26 in the screening sector 20 have a different open area to others. In the device 10 as shown in FIG. 1 the impact mechanism 12 is driven to rotate about the rotation axis 14 in the clockwise direction. The open area of the holes/gaps 26 is arranged to progressively change in the direction of rotation of the impact mechanism. More particularly in this embodiment the progressive change is a reduction in the open area of the holes 26. Therefore holes 26 near the "12 o'clock position" shown in FIG. 1 have a larger open area than the holes 26 near the "6 o'clock position".

This change in open area may be organised in relation to sets or groups of holes or gaps 26. That is, the holes/gaps 26 may be arranged in 2 or more sets or groups holes/gaps where the open area of the holes/gaps in the same set/group is the same, but the open area of holes in a different set/group is different. The number of holes or gaps per set need not be the same. For example, the first five holes 26 from the 12 o'clock position shown in FIG. 1 form a first set of holes each with the same open area, while the ten holes 26 closest to the 6 o'clock position form another set of holes each with the same open area as each other but having a smaller open area than a hole 26 in the first set. The screening sector 22 may have two or more sets of holes 26. The sets 26 may extend for the same or different arc length. For example, when θs=180°, if there are two sets of holes 26 then one set may extend 60° and the other for 120°; or, both may extend for about 90°. If there were three sets of holes in each may extend for 60°; but in another embodiment once it may extend for 40°, another for 60° and another for 80°. In any event the arc length of each set of holes totals the circumferential extent, or arc length, θs of the screening sector 22.

By having the holes 26 of the largest open area closest to the downstream end of the processing sector 20 with respect to the direction of rotation, the largest proportion of milled material is passed through the screening sector 22 per degree of rotation of the impact mechanism 12 at the beginning of its sweep across the screening sector 22.

This embodiment of the device 10 also has a second processing stage 35 comprising a second structure 36 extending circumferentially about and radially outward of the first structure 18. The second structure 36 has a second processing sector 38, and a second screening sector 40. The second processing sector extends 38 for a first circumferential portion of the second structure βm and comprises a second impervious surface 42, which like the surface 24 can be either textured or smooth. The second screening sector 40 comprise a plurality of holes or gaps 44 and extends for a second circumferential portion βs of the second structure 36. The circumferential portions βm+βs=360°.

In this embodiment the structure and configuration of the second processing sector 38 and second screening sector 40 are the same as the first processing sector 20 and the first screening sector 22, respectively. That is the processing surface 42 is textured in the same way as the processing surface 24, having a plurality of valleys with mutually orthogonal axes of different length. Also, the holes/gaps 44 in the screening sector 40 have a same general arrangement as the holes 26 in the screening sector 22. Thus, the second screening sector 40 has sets or groups of holes in which for mutually adjacent sets in the direction of rotation of the impact mechanism 12 the open area of the holes is the sets progressively reduces.

Nevertheless, alternate embodiments are possible where the texturing of the first and second surfaces 24 and 42 is different from each other, and/or the shape and size distribution of holes in the respective first and second screening sectors are different from each other. For example, the processing surface 42 may have valleys of the same configuration as the valleys 28 on the surface 24 but orientated in a different direction. Alternately the textured surface 42 may be arranged to provide a finer degree of processing than the first surface 24 to produce smaller particles. An analogy would be using sandpaper of different grades for example a course grade and then a finer grade. The variations between the textured surfaces 24 and 42 may include the type of texturing for example relief texturing on the surface 24 and elevation texturing on the surface 42. Also one of the surfaces 24, 42 may be smooth with the other being textured.

The respective processing sectors 20, 38 and the screening sectors 22, 40 are circumferentially offset from each other. The circumferentially offset is such that every and any radius from the rotation axis passes through at least one of the first and second processing surfaces 24, 42. Said in another way, the second processing sector 38 extends circumferentially for at least the full extent of the first screening sector 22. The second processing sector 38 may also extend circumferentially beyond each of the axial edges of the first screening sector 22. Therefore, in embodiments of the disclosed device θs+βs≥360°.

The impact mechanism 12 is provided with a plurality (in this instance six) radially extending flails or hammers 46. Each hammer 46 is coupled to a common central hub 48 which rotates about the rotation axis 14. The hammers 46 are provided with bifurcated arms 50 which are pivotally coupled about respective bolts or pins 52 to the hub 48. This enables the hammers 46 to swing if impacted by a hard foreign object which enters mill to minimise the likelihood of major damage.

Each hammer 46 has an outer axial edge 54 which extends parallel to the rotation axis for a length marginally smaller than the depth of the mill. This enables the provision of a small clearance between the upper and lower radial edges of the hammers 46 and an annular plate 56 at one axial end of the mill and base plate 58 at an opposite axial end. An inner circumferential edge of the annular plate 56 forms a feed opening 60 for the mill 10.

The axial edge 54 is formed with a plurality of spaced apart grooves or flutes 61 the purpose of which is to assist in fragmenting elongated material such as straw that may enter the feed opening 60. An impact side 64 of the hammers 46 is substantially planar and lies in the axial plane. A trailing face 66 of the hammers is scalloped. The purpose of this is to balance the impact mechanism 12. In this regard the hammers 46 extend in an axial direction higher than the hub 48. In the absence of the scalloping the centre of gravity of the impact hammers 46 would be axially offset from the centre of gravity of the hub 48 which may lead to instability together with increased bearing wear and heat generation. However other balancing techniques could be used such as the addition of weights.

A second impact mechanism 68 is located between the first and second structures 16, 36. The purpose of the second impact mechanism 46 is to impact fragments of material passing through the holes 26 and the first screening sector 22, and also accelerate this material onto the second processing surface 42.

The second impact mechanism 68 comprises a plurality of impact elements 70 that are arranged in a circle in between the first and second structures 16, 36. Each of the elements 70 is in the form of a metal bar. In various embodiments each element 70 may have a square or rectangular cross section. However, in the illustrated embodiment at least one of element 70 has two flat surfaces 72 and 74, and a curved surface 76 that extends between the flat surfaces 72 and 74.

The first flat surface 72 may lie parallel to, or within 20 degrees of the parallel, to a radial direction of the mill. The second flat face 74 forms an acute angle with the first flat face 72 and lies on a radially inner side of the impact element 70.

In one embodiment the second impact mechanism 68 can be arranged to rotate with the impact mechanism 12 about the rotation axis 14. However, in an alternate embodiment the second impact mechanism 68 can be arranged to rotate in the opposite direction to the impact mechanism 12.

The general operation of the device 10 is as follows. Feed material such as chaff which is a mixture of materials having different particle size, shape, hardness and moisture content, for example small pieces of straw, husks, and seeds enters the device 10 through the feed opening 60. This material is impacted and accelerated in a radially outward direction by the impact mechanism 12 and in particular the hammers 46. The impact by the hammers 46 by itself may fragment the material. In any event material that is radially aligned with the first processing sector 20 is impacted against the first processing surface 24 to cause further fragmentation.

The material may be subject to multiple impacts by the hammers 46 and/or the first processing surface 24. The number of impacts will be dependent in part on the relative location of entry of the material with reference to the leading and trailing edges of the processing surface 24.

The impact mechanism 12 creates a flow of material that has been impacted against the surface 24 to flow to the first screening sector 22. This impacted material passes through the holes/gaps 26 in the first screening sector 22 into the second processing stage 35. The impacted material may be further fragmented by impacts with the hammers 46 and the solid or structural parts of the screening sector 22 between the holes 26 while in the region of the device 10 circumscribed by the first screening sector 22.

When the device 10 is used in relation to chaff it is believed that the structure of the processing sector 20 and the processing surface 24 may induce a differential flow of material depending on the material type leading to different residence time is within the processing sector. In particular it is believed that straw particles may flow along the lands 34 and across the edges 37 of the valleys 28, while seeds in the chaff may predominantly impact in the valleys 28. Consequently, it is believed that the seeds would travel more slowly and therefore have higher residence time within the processing sector than the straw.

After exiting the first processing stage 16 through the first screening sector 22, the impacted and fragmented material then enters the second processing stage 35. The second processing sector 38 is radially aligned with the first screening sector 22. Therefore, the material entering the second processing stage 35 may be impacted by the impact elements 70 or otherwise impacted directly against the second processing surface 42. There may of course be multiple impacts of material against the impact elements 70 and the second processing surface 42 as the material traverses circumferentially towards the second screen stage 40.

Figure 8:
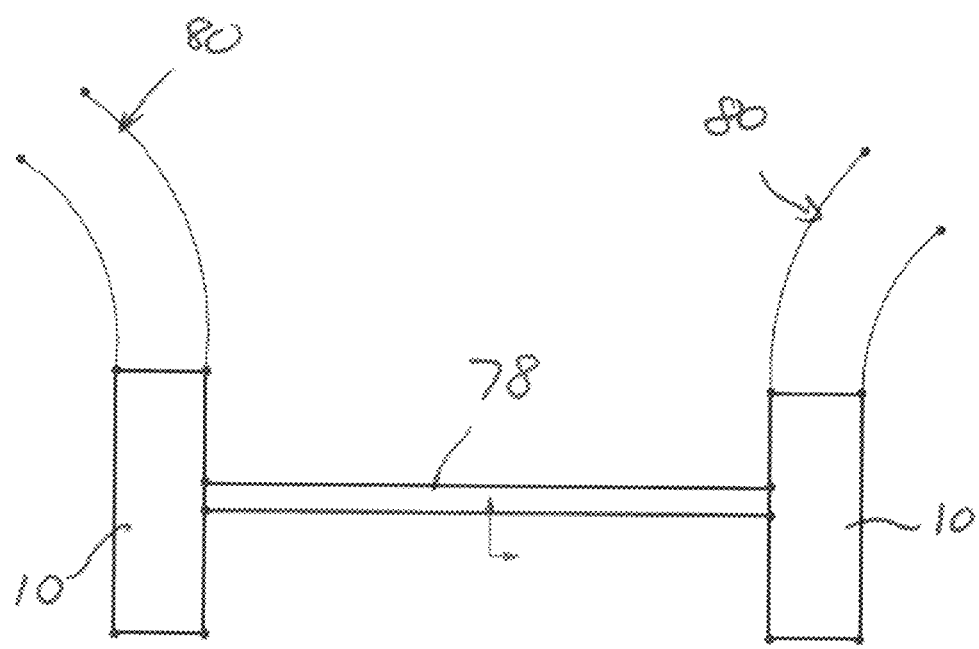
FIG. 8 is a schematic representation of a layout of two devices in accordance with the present disclosure when incorporated in a combine harvester for the destruction of weed seeds.

The device 10 may be mounted so that the rotation axis 14 is horizontal. In that event a chute may be provided to assist in guiding material into the feed opening 60. FIG. 8 depicts a processing system which comprises two devices 10 having their rotation axes 14 mutually aligned. In this embodiment a common drive shaft 78 may be attached to the respective impact mechanisms 12 to facilitate rotation of the impact mechanisms 12. In one possible arrangement of this processing system one of the processing surfaces 24 and 42 may be at the 6 o'clock position with the other at the 12 o'clock position. Though in an alternative arrangement the surfaces 24 and 42 may be at the 3 o'clock position with the other at the 9 o'clock position. Cowling guide walls may be provided to assist in directing the fragmented material to flow along mutually divergent discharge paths 80. The processing system in FIG. 8 may be incorporated in a combine harvester in place of a chaff spreader to receive a chaff stream. In this event a large proportion of weed seeds in the chaff may be devitalise by virtue of the action of the device 10 which processes by way of impact milling or fragmenting weed seeds to the extent that they are incapable of germinating.

In an alternative arrangement, embodiments of the disclose device 10 may also be used in pairs rotating on vertical axes 14 and mounted on a combine for processing chaff as described for example in international publication number WO 2018053600 (Berry) or WO2014/127408 (Berry Saunders) the contents of which is incorporated herein by way of reference. Both of these publications describe a combine having a straw chopper for chopping a straw stream produced by the harvester, and a pair of weed seed devitalisation devices or mills.

Figure 11:
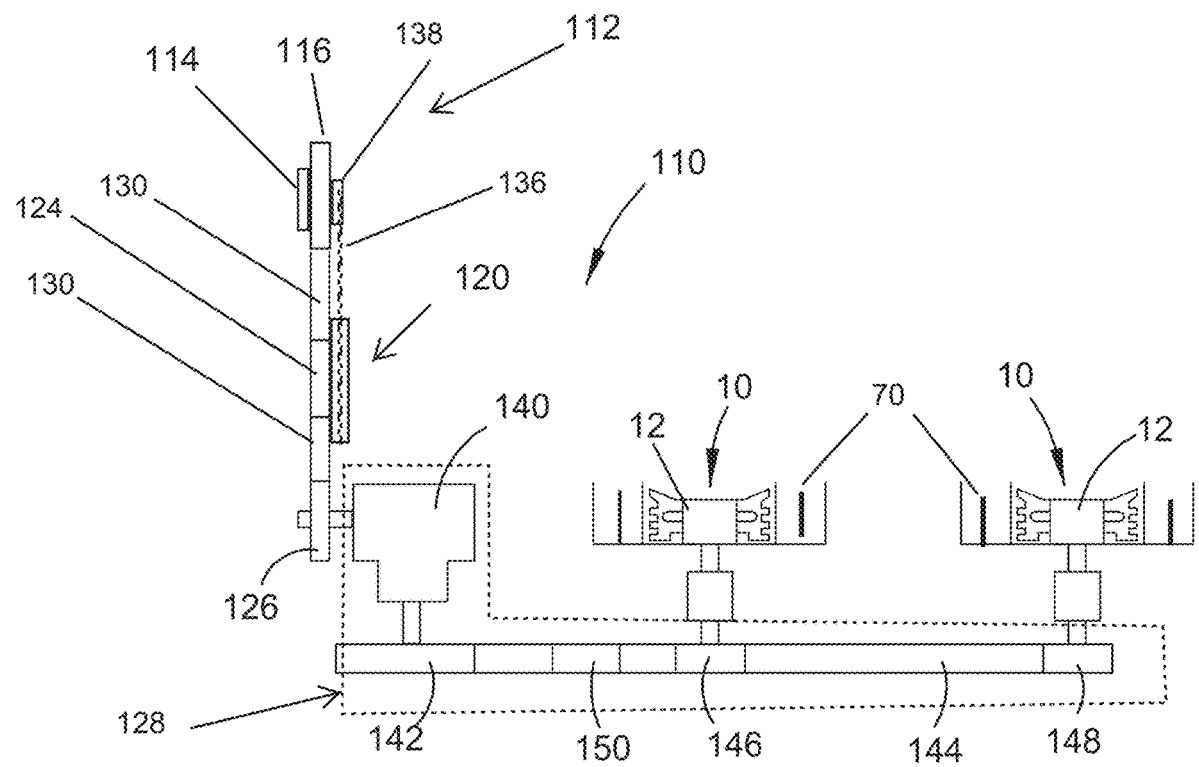
FIG. 11 is a schematic representation of a drive system for driving embodiments of the disclosed impact material device, or other like impact devices, together with a chopper on a combine.
Figure 12:
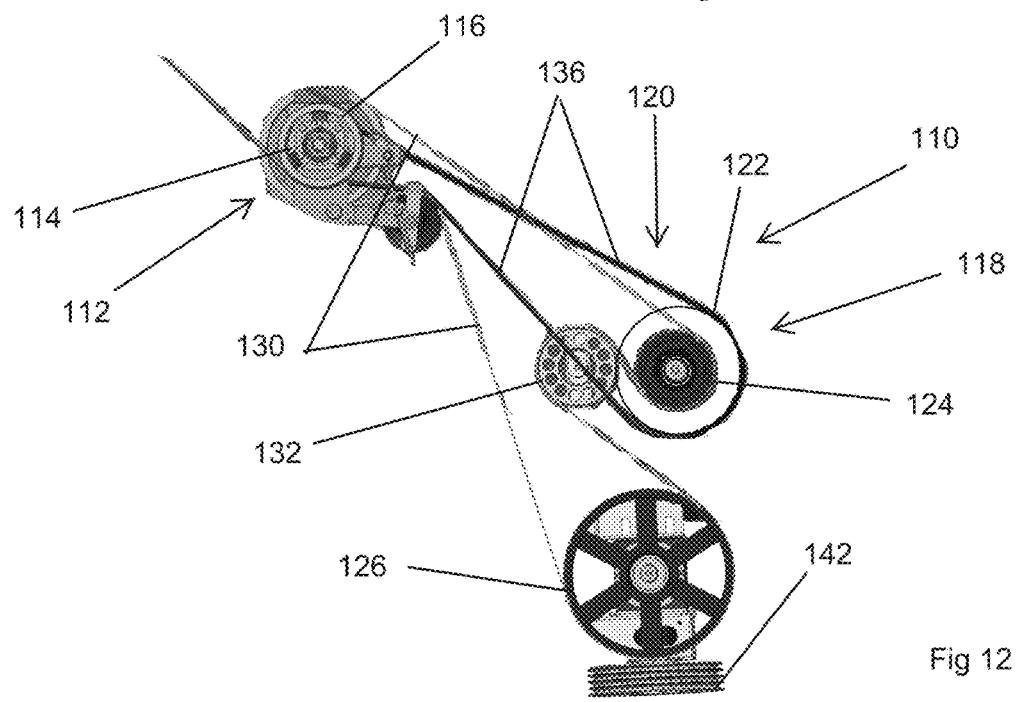
FIG. 12 is an end view of the drive system shown in FIG. 11.

FIGS. 11 and 12 show a drive system 110 that can be used to drive two of the disclosed devices 10 when installed on a combine having a chopper similar to that described in the above referenced Berry Saunders and Berry documents. Moreover, the drive system 110 may be used to drive devitalisation devices or mills like those in the Berry Saunders, and Berry documents as well as other forms of mechanical weed seed devitalisation devices and systems when used in association with a straw chopper on a combine.

FIGS. 11 and 12 show a jack shaft with a pulley arrangement 112 with a small diameter input pulley 114 and a larger diameter output pulley 116. A straw chopper 118 at a driveshaft in which is mounted a pulley arrangement 120 having a large diameter pulley 122 and a small diameter pulley 124. A pair of devices 10 receives drive from an input pulley 126. The drive from the input pulley 126 is transferred to the devices 10 through a transmission system 128 which will be described in greater detail later.

The small diameter pulley 114 is mounted on a jack shaft that receives drive from the combine PTO. The drive system 110 imparts this drive to the chopper 118 and the devices 10. In order to do this at a minimum the drive system 110 may utilise a single belt 130 that engages and runs around the large diameter output pulley 116 the small diameter pulley 124 on the input shaft of the straw chopper 118 and the device input pulley 126. Idler pulleys 132 and 134 are located about the run of the belt 130 and are adjustable so as to vary the degree of wrap of the belt 130 about one or more of the pulleys 116, 122 and 126.

Having the single common belt 130 in the drive system 110 has the advantage and benefit of moving the belt path out of the way of the combine tyres so that narrow tyre centres can be used. A further potential advantage is a reduction of them of components and load sharing on the belt 130.

The drive system 110 may also include a second belt 136 that runs about and engages a small diameter outlet pulley 138 mounted on a jack shaft on the inside of the pulley 116 and the large diameter pulley 122 on the driveshaft of the chopper 118.

When the drive system 110 includes the second belt 136 the pulleys 124 and 122 mounted on the chopper shaft can be selectively disengaged from each other so that they can rotate independently of each other about the chopper drive shaft axis.

Therefore, when the drive system 110 includes only the larger belt 130 both the chopper and the devices 10 are provided with torque/drive from the combine PTO driven by one and the same belt by that single belt. The rotation speed of the blades of the chopper 118 can in this instance be varied by moving the belt 130 from the small diameter pulley 124 to the large diameter pulley 122. However, when the drive system 110 also incorporates the second belt 136 which runs around the large number pulley 122 then a selector or mechanism (not shown) can be operated to rotationally disengage the small diameter pulley 124 so that it freely spins on the chopper drive shaft.

In a further variation the pulley 126 can be coupled to a corresponding drive shaft in a manner so that it can be selectively engaged or disengaged with the drive shaft. This can be achieved using known suitable mechanical devices such as bearings and gears; or a spline arrangement. In this way if desired drive to the devices 10 can be effectively turned off in which case the pulley 126 but the shaft on which is mounted does not.

In the particular embodiment shown in FIGS. 11 and 12 the transmission system 128 comprises a right-angle gearbox 140 which mechanically transfers drive from the pulley 126 to a pulley 142. The pulley 142 drives a belt 144 that engages pulleys 146 and 148 which are connected to respective drives hafts of the devices 10 for rotating the impact mechanisms 12 and the elements 70. A tensioner pulley 150 is also incorporated in the transmission system 128 for tensioning the belt 144.

It should be realised the form of the transmission system 128 is inconsequential to the nature structure and functionality of the drive system 110. For example, the transmission system 128 can be replaced by a driveshaft which is driven by the pulley 126 and connects through gears to rotate the impact members 12 and elements 70 of the devices 10.

Now that an embodiment has been described, it should be appreciated that the mill maybe embodied in many other forms. For example, the textured surfaces may be formed with valleys or recesses of different shape to the elliptical type valleys depicted. Also, each textured surface may have a plurality of valleys recesses of different shape and configuration for example the textured surface 24 may comprise hemispherical and elliptical recesses, or triangular and rectangular recesses, or hemispherical, rectangular and hexagonal recesses. Additionally, each processing stage may have more than one processing sector and more than one screening sector. For example, in one arrangement one processing stage may have two processing sectors extending each for 90° interleaved with two screening sectors each extending for 90°. Also, in another variation the hammers 46 may be fixed rather than pivoted to the hub 48 and thus not act as flails but rather simple hammers or paddles. The hammers 46 may be fixed by way of respective single arms rather than the bifurcated arms 50 shown in the present drawings. The trailing face 66 of the hammers 46 can be formed as a planar surface, rather being is scalloped. The outer axial edge 54 of the hammers 46 can be substantially straighter of than having the flutes 61.

The first and second screening sectors 22, 40 can be formed in a number of different ways. For example, they can be formed as mesh like screens having for example holes or gaps formed between intersecting elements such as wire, or holes punched in a plate material. Alternately the screening sectors 22, 40 may be in the form of a plurality of elongate elements such as bars or rods that are circumferentially spaced from each other around the axis 14. The elongate elements may be orientated generally parallel to the axis 14, though in other embodiments they may be inclined to the axis 14. The elongate elements may for example have a circular or rectangular cross section, with the holes/gaps 26, 44 being in the form of gaps between mutually adjacent elongate elements. The elements may be solid, such as a solid bar or rod; or can be formed from plates which are roll formed or bent. In the latter instance the elements may have a combination of flat and curved surfaces.

The structures 18 and 36 in the device 10 are stators against which the material is impacted. The degree of processing by the device 10 can be varied by vertically moving one or both of the structures 18 and 16 so as to extend at least partially above the plate 56 and thereby leave a corresponding gap between the bottom of the structures 18 and/or 36 and the base plate 58. This gap provides a flow path for the material entering the device 10 to pass to a housing which extends circumferentially about the outermost structure 36 and is provided with an outlet for the processed material. It is believed that only a small gap is required to substantially bypass the processing otherwise provided by the device 10. That is because the gap will produce or form a low-pressure zone to which the material entering through the inlet 60 will preferentially flow. A small scissor lift mechanism located on the plate 56 at diametrically opposed locations can be connected to one or both of the structures 18/36 to raise or lower the structures 18/36 from and back onto the base plate 58.

Figure 2:
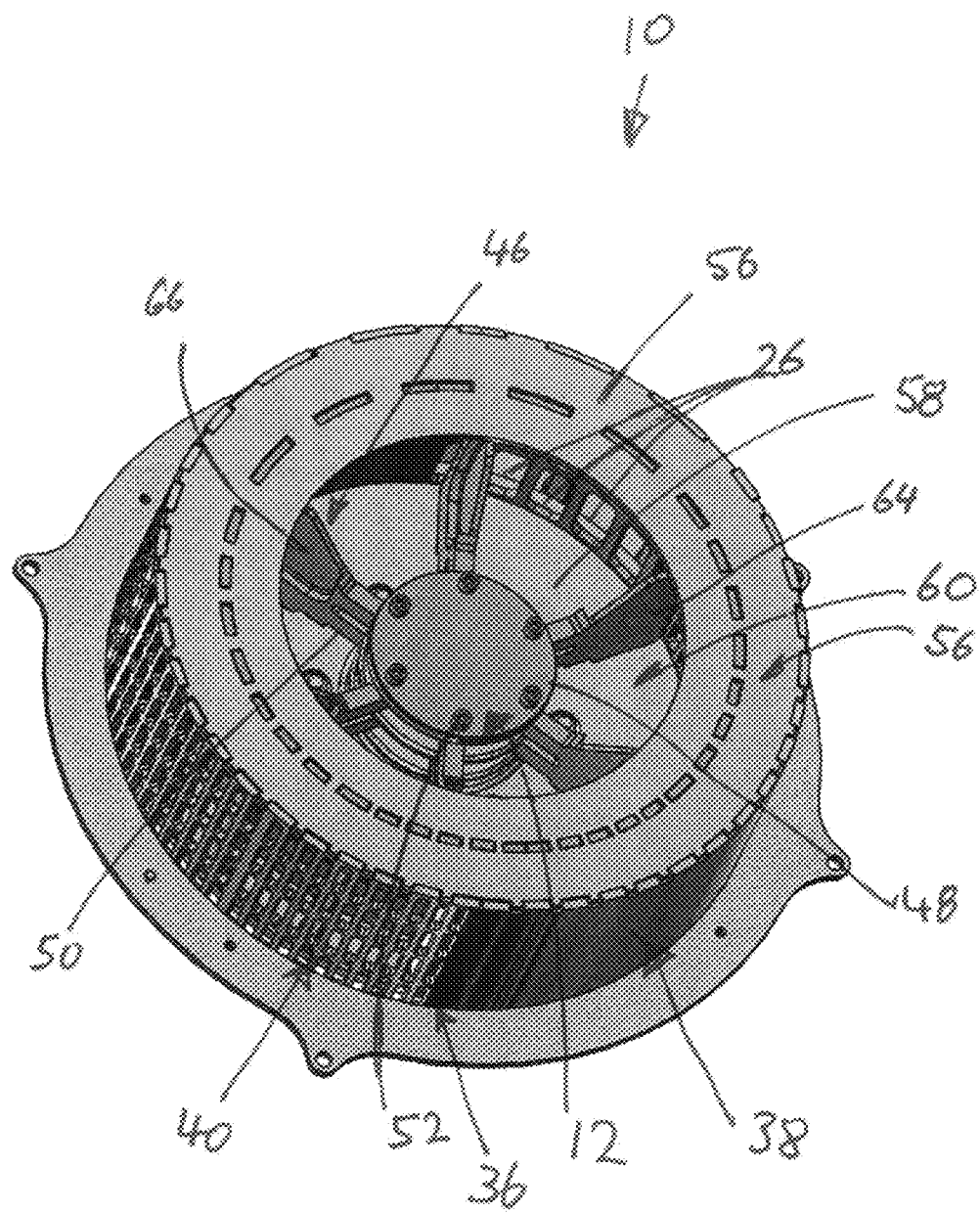
FIG. 2 is a schematic representation of the device shown in FIG. 1 with the annular end plate attached.
Figure 3:
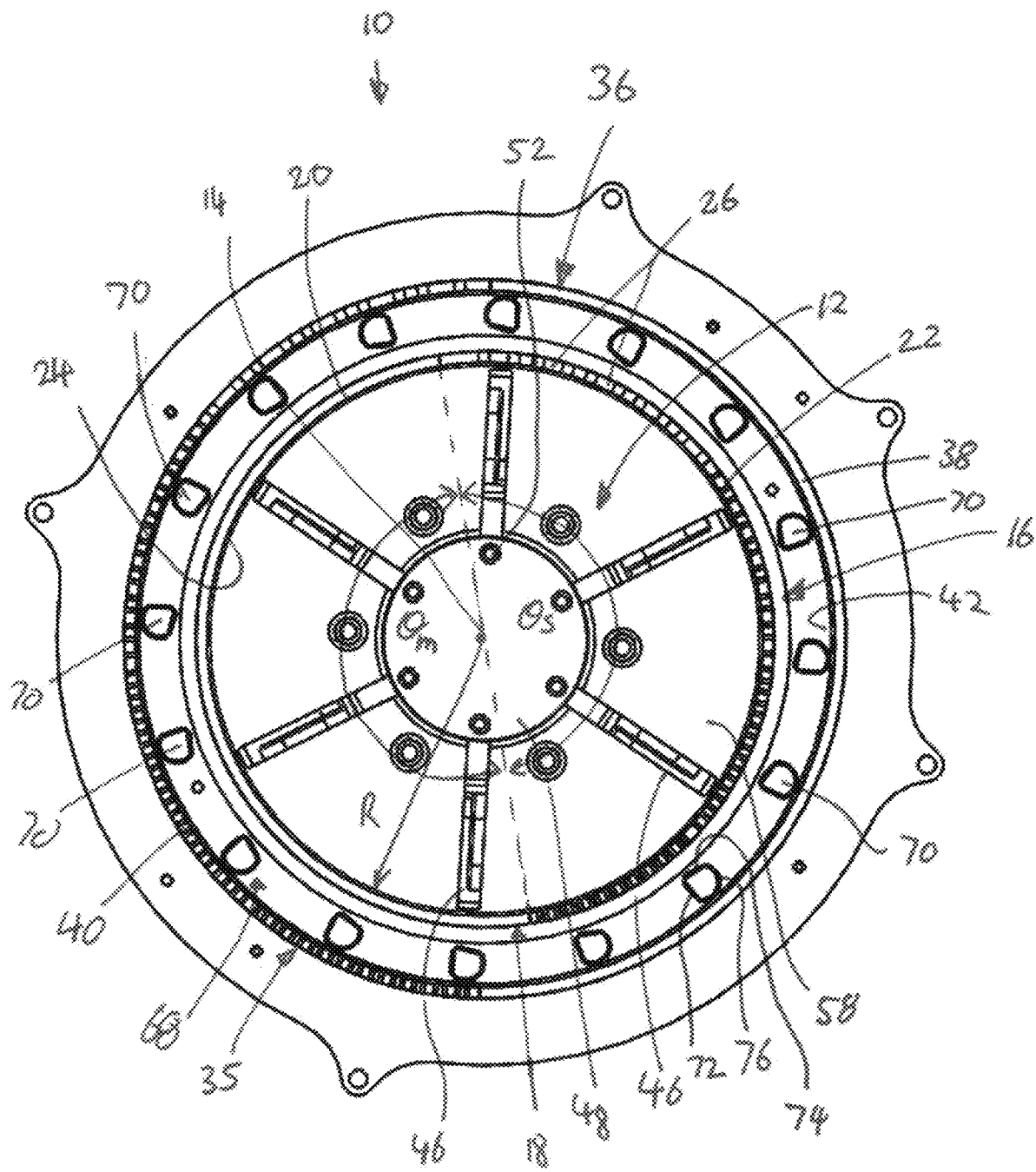
FIG. 3 is a plan view of the device shown in FIG. 1.
Figure 7:
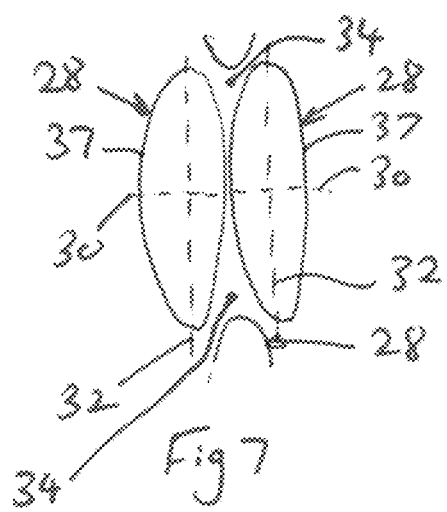
FIG. 7 is an enlarged view of a valley provided in the first processing sector.
Figure 15:
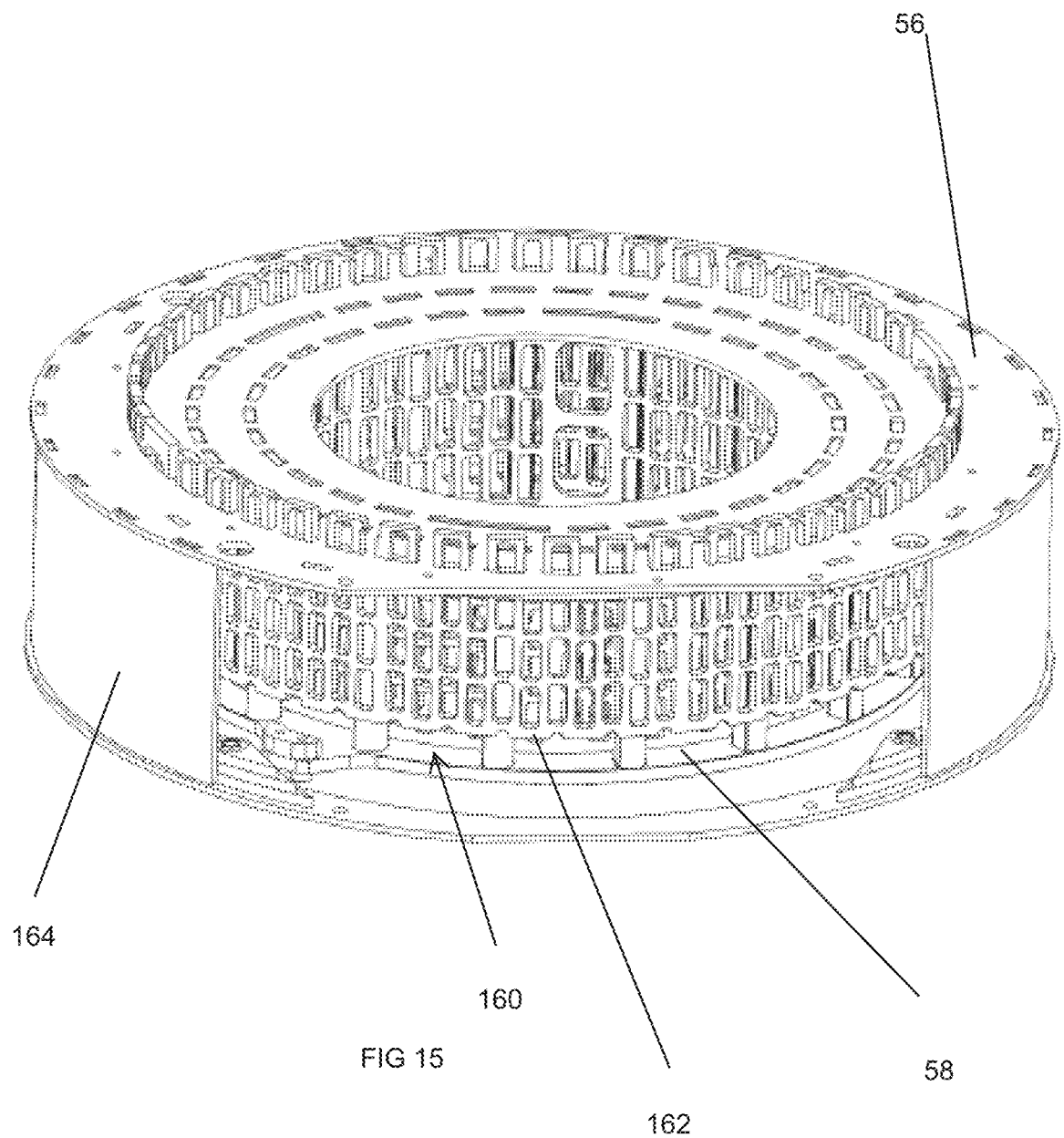
FIG. 15 is a schematic representation of a bypass system that maybe incorporated in embodiments of the disclosed device and other impact processing devices

Indeed it should be recognised that this structure and method for bypassing or otherwise enabling a modification of the degree of processing performed by the device 10 can also be applied to other types of impact devitalisation systems and devices including in particular, but not limited to, the multistage hammer mill in the above referenced Berry document WO 2018053600. To this end references made to enclosed FIG. 15 which show a stator arrangement comprising three circular arrays of screens where the outer most screen is raised to extend partially above the plate 56 leaving a corresponding gap 160 between the lower edge 162 of the screen and the base plate 58. A circular outer wall 164 forming a housing is also shown this will have an opening for discharge of the material. A similar housing may be provided in the embodiment of the device shown in FIGS. 1-3.

Figure 9:
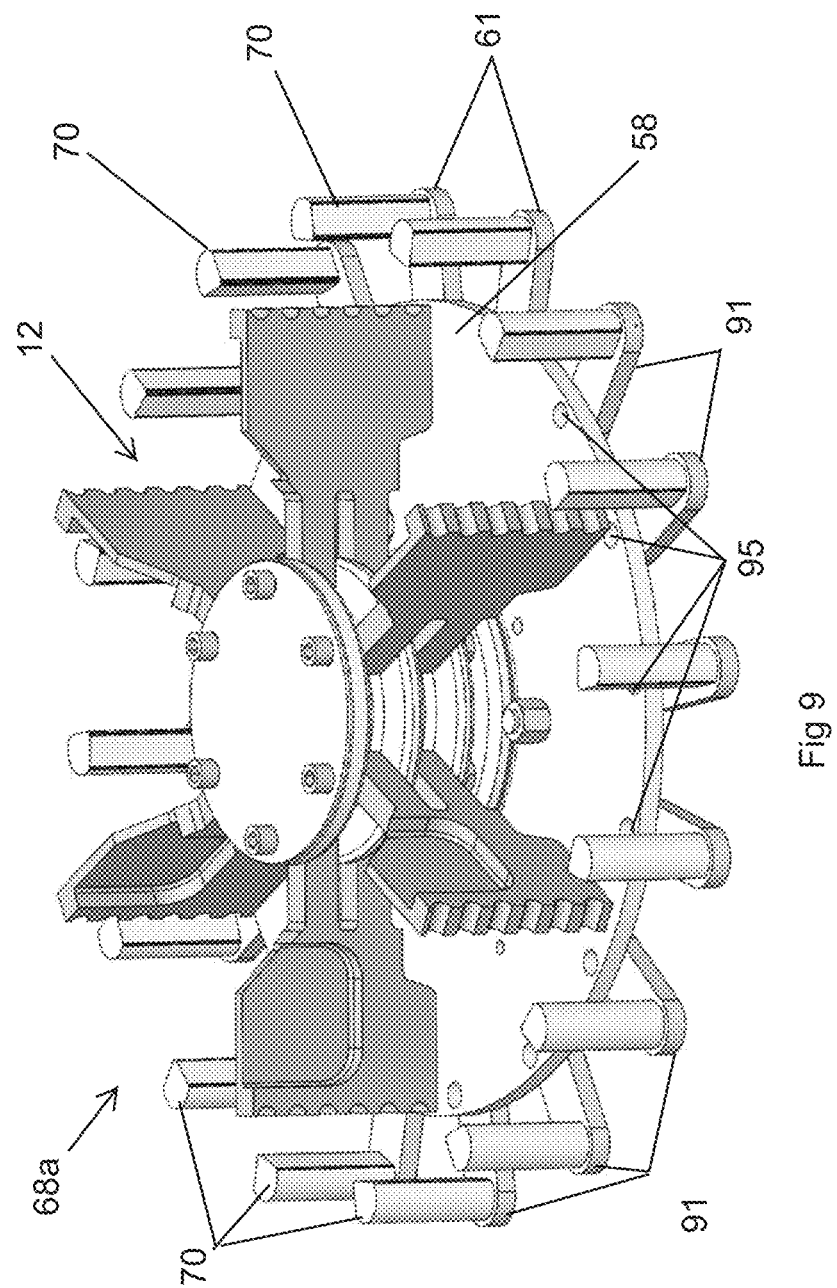
FIG. 9 is a schematic representation of a form of a second impact mechanism that may be incorporated in an alternate embodiment of the disclosed device.
Figure 10:
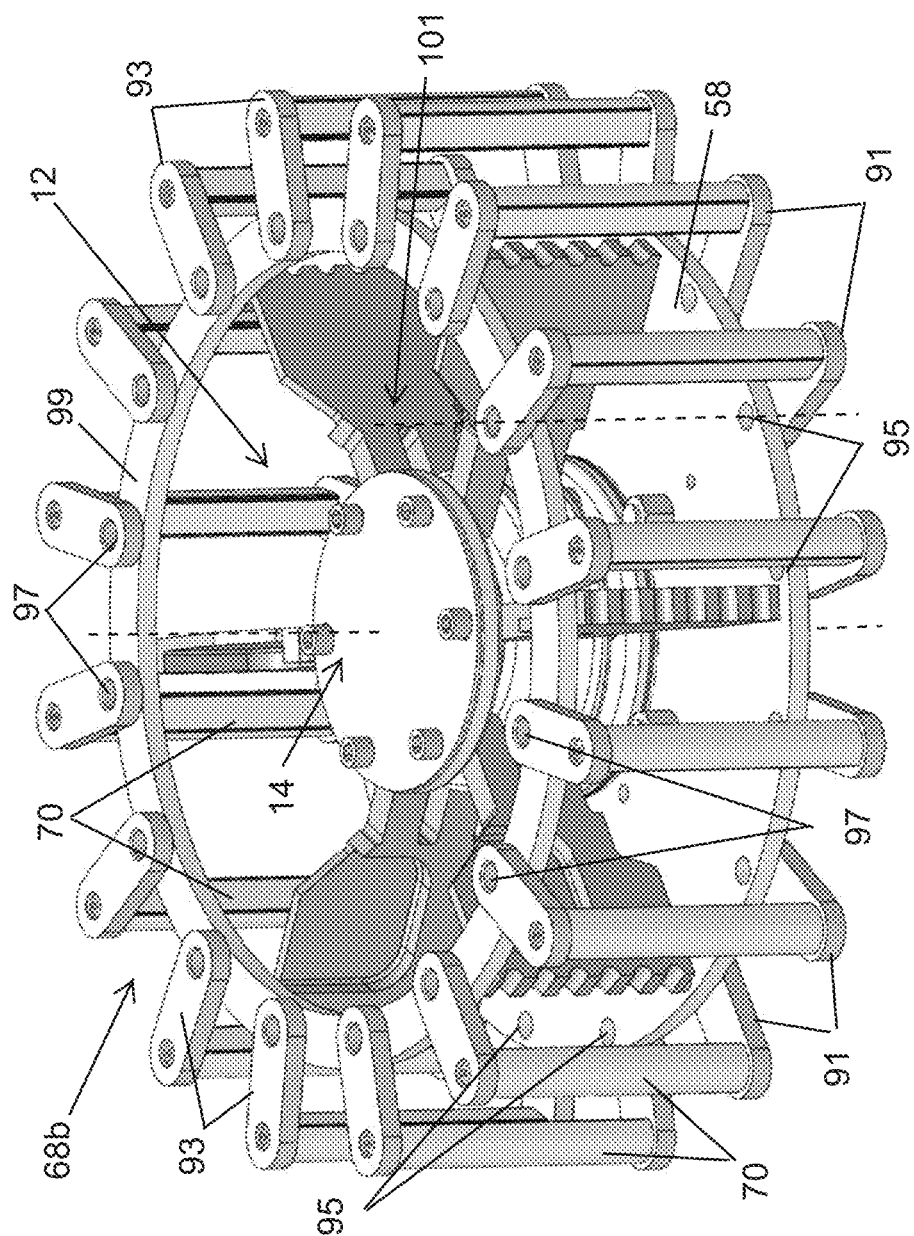
FIG. 10 is a schematic representation of another form of a second impact mechanism that may be incorporated in yet a further embodiment of the disclosed device.

FIGS. 9 and 10 show alternate structures for the impact mechanism 68. In FIG. 9 second impact mechanism, denoted here as 68a may be formed so that the impact elements 70 are mounted at the end of pivoting cantilever arms 91. The arms 91 are pivotally coupled by pivots 95 to the plate 58. FIG. 10 shows a further variant as second impact mechanism 68b in which the elements 70 are fixed at opposite end to respective lower and upper arms 91, 93. The arms 91 are coupled by pivots 95 to the plate 58. The upper arms 93 are coupled by pivots 97 to a ring 99. The pivots 95, 97 for each impact element 70 lie on a common axis 101 that is parallel to the rotation axis 14. Thus, here each impact element 70 and its coupled arms 91, 93 form an impact unit that can pivot about respective axes 99. The central impact mechanism 12 together with the respective second impact mechanisms 68a or 68b, may be taken to form respective rotors.

Figure 13:
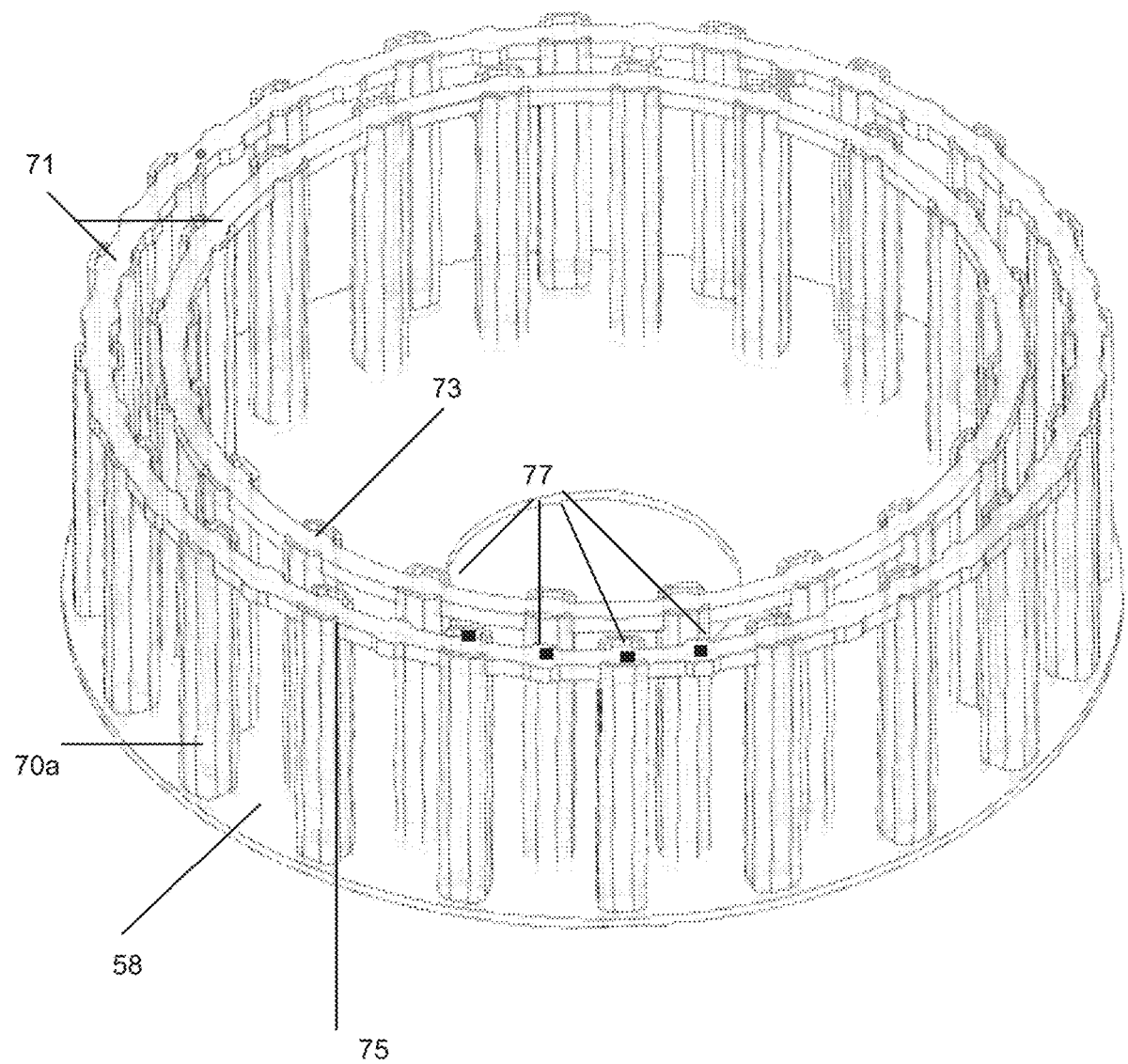
FIG. 13 is a schematic representation of an alternate structure and method of construction of the impact elements incorporated in the device.

Yet a further possible variation of the impact mechanism 68a is shown in FIG. 13. Significantly, in this variation the impact elements 70a are hollow rather than being solid as per the elements 70 in the early described embodiment shown in FIGS. 1 and 3. While the hollow elements 70a could have the same profile as elements 70, in this embodiment they are shown with a rectangular profile or cross section. Indeed, the elements 70a could be formed with a section of any desired shape. At the lower end is the elements 70a are attached to the base plate 58. At the upper end the elements 70a are connected by a ring 71. The ring 71 is provided with spaced apart keys 73 that fit into respective elements 70a. To facilitate this, channels 75 are laser cut or otherwise formed in the upper end of the elements 70a to seat the ring 71. Holes 77 may be drilled in the ring 71 to rotationally balance the impact mechanism 68a. Alternately small weights may be added to the ring 71 for this purpose similar to balancing a wheel on a motor vehicle.

Using hollow elements 70a provides the benefits of saving weight, cost and critically reducing the moment of inertia. The elements 70a may be coated with laser cladding of tungsten carbide matrix to provide increased wear protection. A possible manufacturing sequence is to first form the hollow elements 70a with the desired profile, clad with the tungsten carbide matrix and then laser cut to form the keys for receiving the ring 71. The lower end of the elements 70a and then fixed to the base plate 58 and subsequently the ring 71 and keys 73 are fitted into the channels 75 at the upper ends of the elements 70a. The ensemble of the base plate 58, elements 70a and ring 71 are placed on a rotational balancing machine and holes 77 drilled if and when necessary in the ring 71 including the keys 73 to achieve rotational balance.

It should of course be understood that this form of impact mechanism 68a may of course be used in seed devitalisation devices and systems other than those specifically described in this specification. For example, the impact mechanism 68a may be utilised in the multistage hammer mill described in the above referenced Berry document. Specifically, with reference to FIG. 5a of the Berry document reproduced herein as FIG. 14 although with reference numbers to match the current specification.

Figure 14:
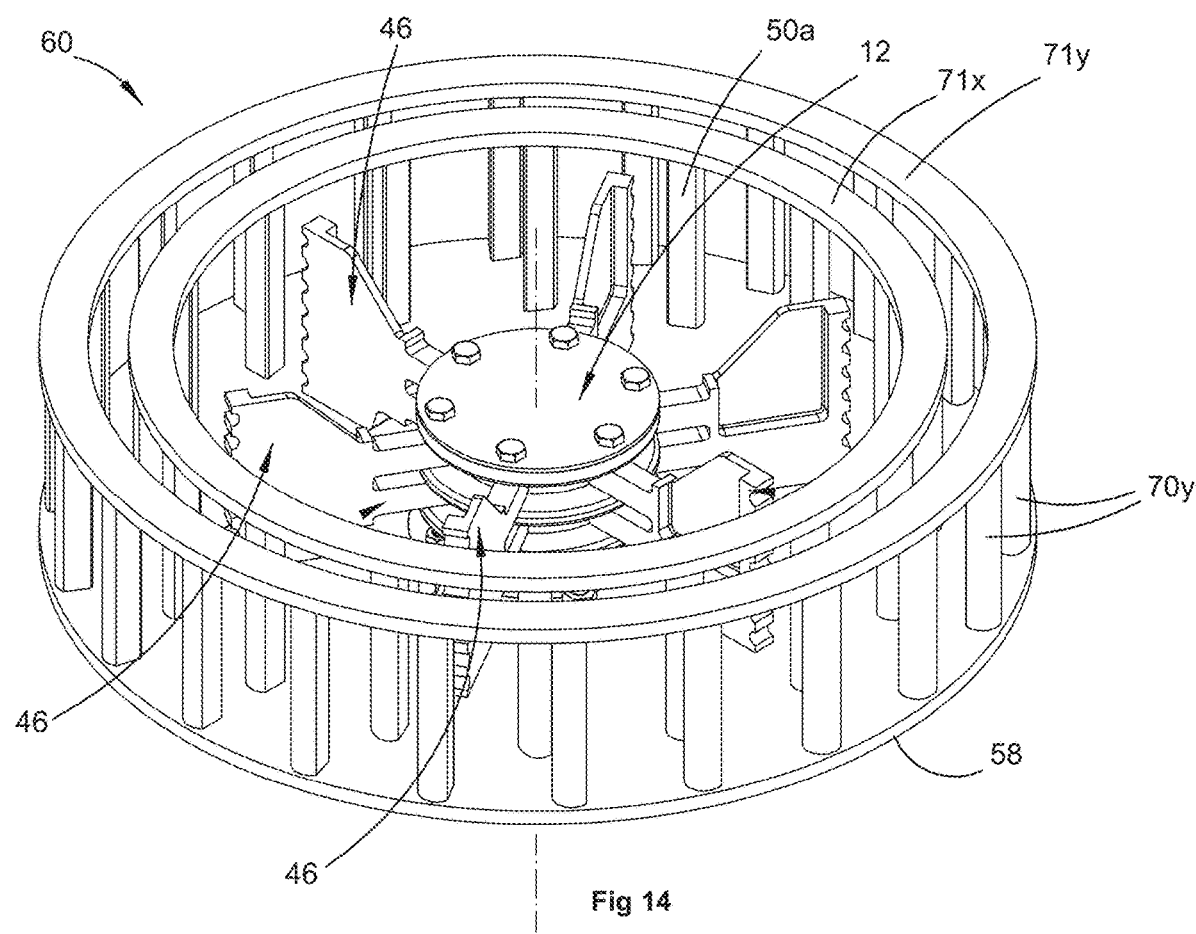
FIG. 14 is a schematic representation of a rotor assembly that may be incorporated into an embodiment of the device.

FIG. 14 shows a rotor arrangement for a multistage hammer mill with an impact mechanism 12 with radially extending hammers/flails 46 coupled to a base plate 58 and provided with two concentric rows of impact elements 70x and 70y connected to respective rings 71x and 71y. The impact elements 70x and 70y and rings 71x and 71y may be formed in the same way as the elements 70a and ring 71 described above and shown with reference to FIG. 13. Thus, in a general sense in one aspect an impact device for devitalising weed seeds may comprise a central impact mechanism 12 and at least one circular array of impact elements 70 radially spaced from and surrounding the impact mechanism and in which the impact elements 70 are hollow. In this aspect of the impact device the impact elements 70 are connected together at one end by a common ring 71. The ring 71 engages in or otherwise form fits with the hollow impact elements 70. This is achieved by forming channels 75 at the one of the elements 70 for receiving the ring and corresponding keys that seat within the hollow region of the elements 70. Holes 75 and subsequently be drilled into the ring 71 to rotationally balance the rotating parts of the impact device. The impact device may be formed with one or more perforated screens extending about the impact mechanism 12 exactly as described in the Berry document referenced herein and shown in for example FIGS. 2 and 6 of the Berry document. Therefore, in one example there may be a screen surrounding the impact mechanism 12 on the inside of the first ring 71x, then a second perforated screen between the rings 71x and 71y, and a final perforated screen surrounding the outside of the ring 71y. It is these perforated screens would be used in place of the first and second structures, 24, 42 of the embodiment shown in FIGS. 1-3.

Embodiments of the disclosed device 10 may include further structural and operational modifications as well as facilitate the incorporation of various sensors to enable monitoring of the performance of the device 10 as well as a harvester on which it is mounted. Information obtained from the sensors may also be used to automatically modify the device 10 or harvester performance. Some of these are briefly discussed below.

A gate or trapdoor or other sample system or device may be provided at or upstream of the inlet/feed opening 60 of the device(s) 10 that can be opened and closed or otherwise operated for example by an actuator controlled from a cabin of the harvester for capturing a sample of chaff prior to flowing into the inlet 60. Alternately automatic sampling may be incorporated. Capturing a sample of the chaff enables monitoring or measurement of grain loss in the separating system of the combine. When a trapdoor is incorporated it may lead to: a small receptacle for holding a sample for later testing; or alternately, feed the sample to an on-board measurement system that may make real time measurements of grain loss against samples collected at an upstream end of an associated shaft/straw separation system (e.g., a thresher). The measurement system may include an optical or vision-based system for comparing upstream and downstream samples. Information obtained from such measurements may be used for automatically adjusting header parameters of the combine via a control system that may also include artificial intelligence processing.

A sample of the chaff processed by the device 10 could also be taken at the device outlet and compared with sample taken at or prior to the inlet 60. These samples may be compared to give a measurement of the degree of processing/milling and in particular weed seed devitalisation provided by the device 10. In turn this can be compared to a prescribed target and communicated to an in-cabin monitoring and control system, or an autonomous control system. In either case the control system may be arranged to effect a change in the configuration or operational characteristics of the device 10 to achieve a target degree of processing/weed seed devitalisation. For example, the control system may be arranged to vary one, or a combination of any two or more of:
  the speed of rotation of the impact mechanism 12 and elements 70;
  torque delivered to the impact mechanism 12 and elements 70;
  travel speed of the combine.

Data or information obtained from the above sampling and analysis may be used in conjunction with other information system such as: forward speed of the combine harvester to which the device 10 and choppers are mounted; and GPS data; to calculate the amount of material processed by the device 10 and associated combine harvester including geographically tagging the data. Other possibilities include weed mapping with the volume or density of weeds obtained either through the sampling of the material before and after being processed by the device 10 using samples for example obtained through the trapdoors, or by optical detection of weeds via detectors on the combine immediately prior to cropping and tagging this to corresponding GPS data. Biomass mapping is also possible for example by use of torque sensors to sense or measure the torque delivered to the device 10. This may be beneficial in terms of different business or revenue models for commercialisation of the system 40 and/or combine harvester in enabling for example lease payments/charges being made on the basis of the calculated amount of material processed by the combine harvester.

It will also be appreciated that the above described methods and systems for sampling can be applied to other forms of mill and hammer mill type seed devitalisation system such as those described in the Berry Saunders; and, Berry documents referred to in this specification.

In the claims which follow, and in the preceding description, except where the context requires otherwise due to express language or necessary implication, the word "comprise" and variations such as "comprises" or "comprising" are used in an inclusive sense, i.e. to specify the presence of the stated features but not to preclude the presence or addition of further features in various embodiments of the device and method as disclosed herein.

The invention claimed is:

1. An impact material processing device comprising:
  a central impact mechanism arranged to rotate about a rotation axis;
  a processing stage comprising the central impact mechanism and a structure extending circumferentially about the impact mechanism, the structure having a processing sector and a screening sector, wherein the processing sector extends for a first circumferential portion of the structure and includes an impervious surface and the screening sector comprise a plurality of holes or gaps and extends for a second circumferential portion of the structure, the impact mechanism operable to impact material against the processing sector and generate a flow of impacted material to the screening sector through which at least a portion of the impacted material can pass.

2. The device according to claim 1 wherein the impervious surface comprises a plurality of valleys.

3. The device according to claim 2 wherein at least some of the valleys have two orthogonal axes of unequal length.

4. The device according to claim 3 wherein a shorter of the orthogonal axes extend in a circumferential direction with respect to the rotation axis.

5. The device according to claim 1 wherein the plurality of holes or gaps comprises a first hole or gap of a first open area, and a second hole or gap of a second open area being different to the first open area.

6. The device according to claim 5 wherein the holes or gaps are arranged in a plurality of sets of two or more hole or gaps, wherein the open area of holes or gaps in a first set are the same as each other, and the open area of holes or gaps in a second set are the same as each other but of a different open area to the hole or gaps in the first set.

7. The device according to claim 1 wherein the impact mechanism comprises a plurality of impact flails coupled to and extending radially from a central hub, the central hub being arranged to rotate about the rotation axis; and wherein at least one of the impact flails is capable of pivoting about a pivot axis which lies parallel to the rotation axis.

8. An impact material processing device comprising:
a central impact mechanism arranged to rotate about a rotation axis;
a first processing stage comprising the central impact mechanism and a first structure extending circumferentially about the impact mechanism, the first structure having a first processing sector and a first screening sector, wherein the first processing sector extends for a first circumferential portion of the first structure and includes a first impervious surface and the first screening sector comprise a plurality of holes or gaps and extends for a second circumferential portion of the first structure, the impact mechanism operable to impact material against the first processing sector and generate a flow of impacted material to the first screening sector through which at least a portion of the impacted material can pass, and a second structure extending about and radially outward of the first structure, the second structure having a second processing sector and a second screening sector, wherein the second processing sector extends for a first circumferential portion of the second structure and includes a second impervious surface and the second screening sector includes a plurality of holes or gaps and extends for a second circumferential portion of the second structure.

9. The device according to claim 8 wherein (a) the first and second processing sectors are circumferentially offset from each other; or (b) the first and second processing sectors are circumferentially offset from each other so that every radius from the rotation axis passes through at least one of the first and second impervious surfaces.

10. The device according to claim 8 wherein the first impervious surface includes a plurality of first valleys and the impervious surface includes a plurality of second valleys.

11. The device according to claim 10 wherein at least some of (a) the first valleys, or (b) the second valleys, or (c) first valleys and the second valleys have two mutually orthogonal axes of unequal length.

12. The device according to claim 10 wherein the first valleys and the second valleys have a different: (a) shape, or (b) size or (c) orientation, or (d) any combination of and two or more of (a), (b) and (c).

13. The device according to claim 8 wherein the plurality of holes or gaps of the first screening sector comprise a first hole or gap of a first open area, and a second hole or gap of a second open area being different to the first open area.

14. The device according to claim 13 wherein the holes or gaps of the first screening sector are arranged in sets of two or more holes or gaps, wherein the open area of holes or gaps in a first set of holes or gaps are the same as each other and the open area of holes or gaps in a second set are the same as each other but of a different open area to the hole or gaps in the first set.

15. The device according to claim 8 comprising a plurality of impact elements disposed between the first and second structures.

16. The device according to claim 15 wherein the impact elements are arranged to rotate with the impact mechanism about the rotation axis.

17. The device according to claim 8 wherein the first and second screening sectors are capable of rotating together in a fixed relationship about the rotation axis in a direction opposite to a direction of rotation of the impact mechanism.

* * * * *